(12) United States Patent
Tsuruta

(10) Patent No.: US 6,189,375 B1
(45) Date of Patent: Feb. 20, 2001

(54) DRIVING ARRANGEMENT FOR MEASURING INSTRUMENTS, AND MEASURING INSTRUMENT INCORPORATING SAME

(75) Inventor: Atsushi Tsuruta, Kure (JP)

(73) Assignee: Mitutoyo Corporation, Kanagawa (JP)

( * ) Notice: Under 35 U.S.C. 154(b), the term of this patent shall be extended for 0 days.

(21) Appl. No.: 09/334,589

(22) Filed: Jun. 16, 1999

(30) Foreign Application Priority Data

Jul. 15, 1998 (JP) .................................................. 10-200312

(51) Int. Cl.⁷ ....................................................... G01B 5/28
(52) U.S. Cl. ............................................. 73/105; 74/89.15
(58) Field of Search ................ 74/89.15; 73/105; 356/371

(56) References Cited

U.S. PATENT DOCUMENTS 4,765,181 * 8/1988 Numoto et al. .......................... 73/105
5,973,777 * 10/1999 Nomoto et al. ..................... 356/371 X

* cited by examiner

Primary Examiner—Rodney H. Bonck
(74) Attorney, Agent, or Firm—Frishauf, Holtz, Goodman, Langer & Chick, P.C.

(57) ABSTRACT

A driving arrangement is provided for a measuring instrument having a movable element which is movable relative to a measuring instrument body. Measurement of an object to be measured is carried out through movement of the movable element. A driving and guide device is mounted on the measuring instrument body, and includes a driving cylinder having a piston received therein for axial movement. The movable element is moved in synchronism with the axial movement of the piston. A hydraulic fluid control device is arranged at a location remote from the measuring instrument body, for supplying hydraulic fluid to the driving cylinder of the driving and guide device to cause the axial movement of the piston of the driving cylinder.

28 Claims, 5 Drawing Sheets

DRIVING ARRANGEMENT FOR MEASURING INSTRUMENTS, AND MEASURING INSTRUMENT INCORPORATING SAME

BACKGROUND OF THE INVENTION

1. Field of the Invention

The present invention relates to a driving arrangement for measuring instruments of a type having a movable element which is movable relative to the main body of the measuring instrument so as to carry out measurement of an object to be measured, through movement of the movable element, and a measuring instrument incorporating the driving arrangement.

2. Prior Art

Conventionally, there are known measuring instruments having a movable element which is movable relative to the body of the measuring instrument so as to carry out measurement of an object to be measured, through movement of the movable element. The known measuring instruments include a surface roughness measuring instrument which has a stylus as the movable element, which is moved along a measuring surface of an object such that displacement of the stylus in a direction orthogonal to the direction of movement of the stylus is detected to thereby measure the surface roughness of the object.

The known surface roughness measuring instrument has a driving unit for moving the stylus along the measuring surface of the object, which is comprised of a feed screw shaft supported on a base via a rolling bearing or the like in a fashion extending parallel with the moving direction of the stylus, a motor drivingly coupled to the feed screw shaft, a nut-shaped member threadedly fitted on the feed screw shaft in a fashion being permitted to move only axially of the feed screw shaft, and a roughness sensor having the stylus coupled to the nut-shaped member.

With this arrangement, as the feed screw shaft is rotated by the motor, the nut-shaped member is moved axially of the feed screw shaft while being restrained from rotating, whereby the stylus of the roughness sensor is moved along the measuring surface of the object in synchronism with the movement of the nut-shaped member. At this time, the stylus of the roughness sensor is displaced in a direction orthogonal to the moving direction thereof due to the surface roughness of the object. By detecting the displacement, the surface roughness of the object can be measured.

In the driving unit of the known surface roughness measuring instrument, however, vibrations are generated from mechanical components such as the motor, feed screw shaft, rolling bearing, and nut-shaped member. Therefore, means have to be provided for absorbing such vibrations, which incurs an increase in the cost and time. What is worse, in the surface roughness measuring instrument in particular, such vibrations form a serious obstacle to measuring accuracy, making it impossible to increase the degree of measuring precision.

Besides, the driving unit structure comprised of the motor, feed screw shaft, rolling bearing, nut-shaped member, and others is large in weight, providing a factor of spoiling the weight balance of the entire measuring instrument.

SUMMARY OF THE INVENTION

It is therefore an object of the present invention to provide a driving arrangement for measuring instruments, which can contribute to increase of the degree of measuring precision through reduction of vibrations to be generated, as well as to achievement of a good weight balance of the entire measuring instrument, and a measuring instrument incorporating the driving arrangement.

To attain the above object, the present invention provides a driving arrangement for a measuring instrument having a body, and a movable element being movable relative to the body, wherein measurement of an object to be measured is carried out through movement of the movable element, comprising driving and guide means mounted on the body of the measuring instrument, the driving and guide means including a driving cylinder having a piston received therein for axial movement, the driving and guide means being operable to move the movable element in synchronism with the axial movement of the piston, and hydraulic fluid control means arranged at a location remote from the body of the measuring instrument, for supplying hydraulic fluid to the driving cylinder of the driving and guide means to cause the axial movement of the piston of the driving cylinder.

With the above arrangement, when hydraulic fluid is supplied to the driving cylinder of the driving and guide means by the hydraulic fluid control means, the piston of the driving cylinder is moved by the hydraulic fluid, whereby the movable element is moved in synchronism with the movement of the piston. According to the present driving arrangement, in the body of the measuring instrument the vibration generating factor is reduced to the maximum possible degree. That is, the measuring instrument body is only provided with the driving and guide means including the driving cylinder with the piston received therein for axial movement. As a result, the measuring instrument body is susceptible to vibrations substantially reduced as compared with the construction of the conventional driving unit, whereby a significantly higher degree of measuring precision can be achieved.

Further, while the conventional driving unit has many component parts which are large in weight, such as the motor, feed screw shaft, rolling bearing, and nut-shaped member, the driving arrangement according to the present invention has a reduced weight, which can improve the weight balance of the entire measuring instrument.

Preferably, the driving and guide means comprises a base, guide means mounted on the base in a fashion extending parallel with the moving direction of the movable element and supporting the movable element for axial movement, the driving cylinder supported by the base in a fashion extending parallel with the guide means and having the piston received therein for axial movement, and synchronous moving means for moving the movable element in synchronism with the axial movement of the piston of the driving cylinder.

With this arrangement, the movable element is supported by the guide means for axial movement such that it moves in synchronism with the axial movement of the piston of the driving cylinder. As a result, the driving arrangement has a simple structure but can move the movable element in a stable manner.

Preferably, the guide means comprises a guide shaft mounted on the base in a fashion extending parallel with the moving direction of the movable element, and a holding member movably mounted on the guide shaft and holding the movable element.

More preferably, the guide shaft and the holding member form a position sensor for sensing a position of the movable element during movement.

Preferably, the synchronous moving means comprises a follow-up tubular element movably fitted on the driving cylinder and coupled to the holding member for movement in unison therewith, the follow-up tubular element being formed of a magnetic material and movable in synchronism with the axial movement of the piston of the driving cylinder, which is formed of a magnet, to thereby move the movable element.

Alternatively, the synchronous moving means may comprise a piston rod having one end thereof coupled to the piston of the control cylinder for movement in unison therewith and another end portion thereof projected outwardly from the control cylinder, and a coupling rod coupling the nut-shaped member to the other end portion of the piston rod for movement in unison therewith, the synchronous moving means being movable in synchronism with the axial movement of the nut-shaped member, to thereby move the piston of the control cylinder.

Preferably, the hydraulic fluid control means comprises a base, a feed screw shaft rotatably supported by the base, a motor for rotatively driving the feed screw shaft, a nut-shaped member threadedly fitted on the feed screw shaft for axial movement in unison with rotation of the feed screw shaft, a control cylinder mounted on the base in a fashion extending parallel with the feed screw shaft and having a piston received therein for axial movement, synchronous moving means for moving the piston of the control cylinder in synchronism with the axial movement of the nut-shaped member, and fluid conduit means connecting the control cylinder to the driving cylinder of the driving and guide means, for feeding hydraulic fluid discharged from the control cylinder by the axial movement of the piston of the control cylinder to the driving cylinder to cause the axial movement of the piston of the driving cylinder.

With the above arrangement, the nut-shaped member can be axially moved with high accuracy by rotating the feed screw shaft, and the movable element is axially moved in synchronism with the axial movement of the nut-shaped member, whereby the position and moving speed of the movable element can be controlled in a fine and accurate manner.

Therefore, if the driving arrangement according to the present invention is used in a surface roughness measuring instrument or a like measuring instrument, high measuring accuracy can be assured.

Preferably, the synchronous moving means of the hydraulic fluid control means comprises a follow-up annular element movably fitted on the control cylinder and coupled to the nut-shaped member for movement in unison therewith, the follow-up element being formed of a magnetic material and movable in synchronism with the axial movement of the nut-shaped member, to thereby move the piston of the control cylinder which is formed of a magnet.

Alternatively, the synchronous moving means of the hydraulic fluid control means may comprise a piston rod having one end thereof coupled to the piston of the control cylinder for movement in unison therewith and another end portion thereof projected outwardly from the control cylinder, and a coupling rod coupling the nut-shaped member to the other end portion of the piston rod for movement in unison therewith, the synchronous moving means being movable in synchronism with the axial movement of the nut-shaped member, to thereby move the piston of the control cylinder.

Also alternatively, the hydraulic fluid control means may comprise a hydraulic fluid supply source arranged at a location remote from the body of the measuring instrument, fluid conduit means connecting the driving cylinder of the driving and guide means to the hydraulic fluid supply source, for feeding hydraulic fluid from the hydraulic fluid supply source to the driving cylinder to cause the axial movement of the piston thereof, and restrictor means inserted in the fluid conduit means.

With this alternative arrangement, a hydraulic fluid supply source which already exists in a plant or the like can be utilized to axially move the movable element, and further the axially moving speed of the movable element can be varied by operating the restrictor means.

Further, to attain the above object, the present invention provides a measuring instrument comprising a body, a movable element being movable relative to the body, and a driving arrangement for moving the movable element for carrying out measurement of an object to be measured, comprising driving and guide means mounted on the body of the measuring instrument, the driving and guide means including a driving cylinder having a piston received therein for axial movement, the driving and guide means being operable to move the movable element in synchronism with the axial movement of the piston, and hydraulic fluid control means arranged at a location remote from the body of the measuring instrument, for supplying hydraulic fluid to the driving cylinder of the driving and guide means to cause the axial movement of the piston of the driving cylinder.

The above and other objects, feature, and advantages of the invention will become more apparent from the following detailed description taken in conjunction with the accompanying drawings.

DETAILED DESCRIPTION OF PREFERRED EMBODIMENTS

The present invention will be described in detail with reference to the accompanying drawings showing preferred embodiments thereof.

Figure 1:
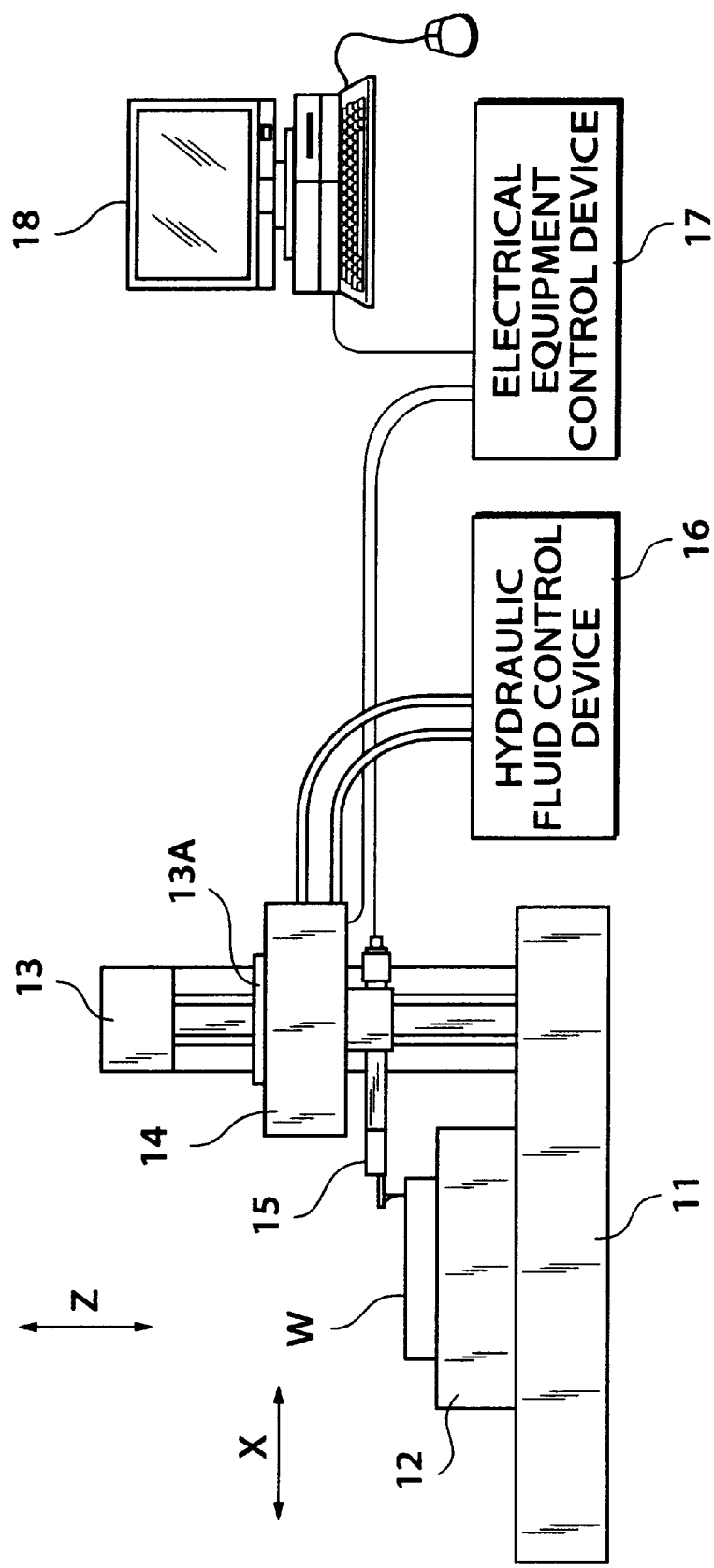
FIG. 1 is a block diagram showing the entire construction of a driving arrangement for a measuring instrument according to one embodiment of the present invention.

Referring first to FIG. 1, there is shown the entire construction of a driving arrangement for a measuring instrument according to one embodiment of the present invention. In this embodiment, the driving arrangement according to the present invention is applied as a driving arrangement for a surface roughness measuring instrument. The surface roughness measuring instrument is comprised of a base (body) 11, a table 12 installed on the base 11, for holding an object or workpiece W to be measured, a support 13 erected on the base 11, a Z-direction driving device 13A fitted on rails provided on the support 13, for movement in a vertical direction (Z direction), a driving and guide device 14 supported by the Z-direction driving device 13A, a roughness sensor 15 as a movable element supported by the driving and guide device 14 in a manner being moved forward and backward in a direction (X direction) orthogonal to the direction in which the support 13 extends, a hydraulic fluid control device 16 for driving the driving and guide device 14, an electrical equipment control unit 17 for processing position data (data indicative of the position of the roughness sensor 15 during movement in the X direction) obtained from the driving and guide device 14 and an output signal (indicative of the position of a stylus of the roughness sensor 15 in the Z direction) from the roughness sensor 15, and a data processing unit 18 for receiving the position data and the sensor output signal processed by and delivered from the electrical equipment control unit 17 and determining, based on these data, the surface roughness of the workpiece W.

Figure 2:
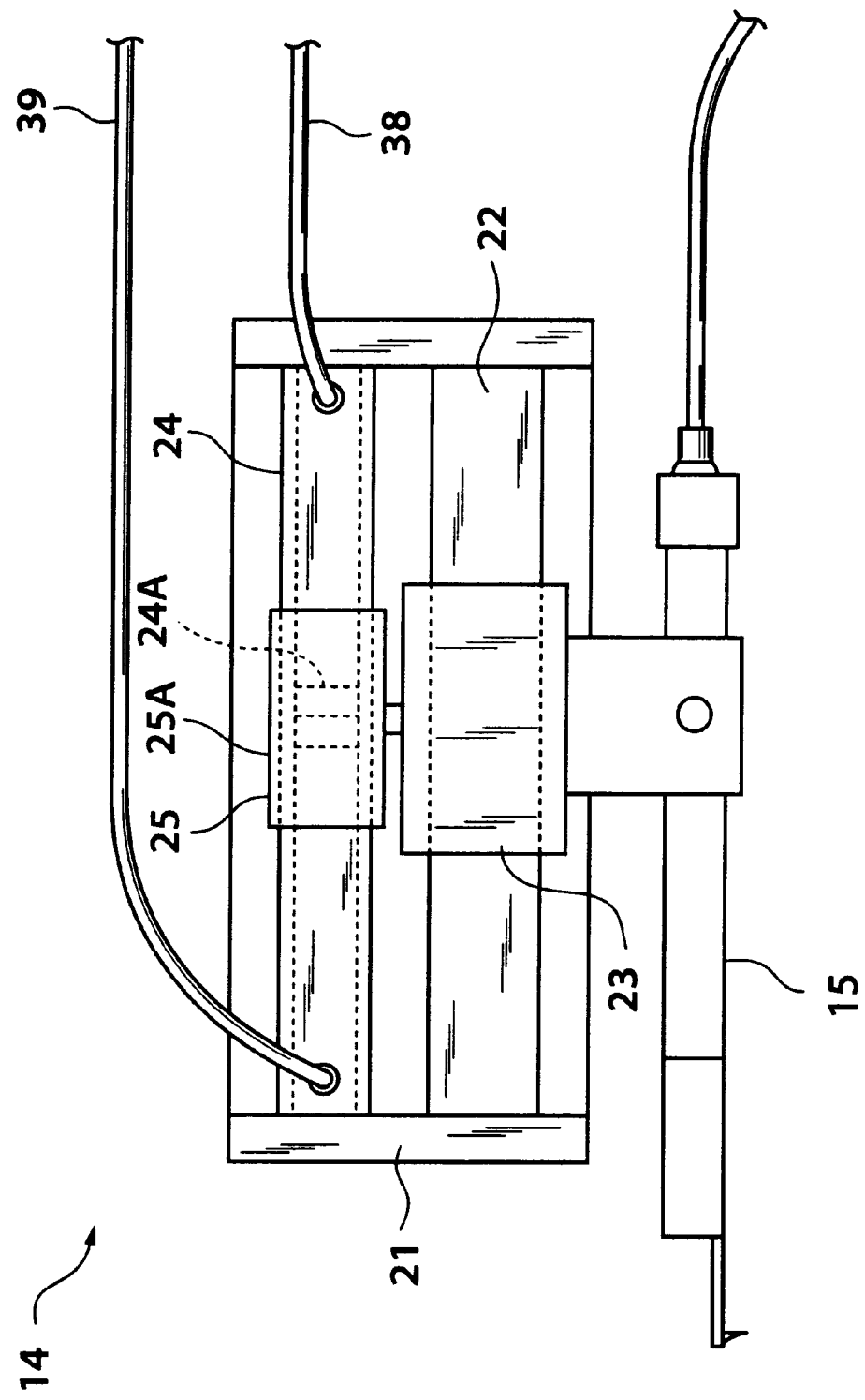
FIG. 2 is a block diagram showing the construction of a driving and guide device of the driving arrangement according to the embodiment.

FIG. 2 shows details of the construction of the driving and guide device 14. As shown in the figure, the device 14 is comprised of a base 21 in the form of a frame mounted on the support 13, for vertical movement therealong, a guide shaft 22 mounted in the frame 21 in a fashion extending parallel with the direction of movement (X direction) of the roughness sensor 15, a holding member 23 slidably fitted on the guide shaft 22 and holding the roughness sensor 15 for movement in unison therewith, a driving cylinder 24 supported by the frame 21 in a fashion extending parallel with the guide shaft 22 and having a piston 24A slidably received therein for axial or forward and backward movement, and synchronous moving means 25 disposed to move the roughness sensor 15 in synchronism with the axial movement of the piston 24A of the driving cylinder 24.

The guide shaft 22 and the holding member 23 cooperate to constitute guide means supporting the roughness sensor 15 in a manner allowing the same to axially move in the X direction. Although not illustrated, the guide shaft 22 is provided with a scale, and the holding member 23 is provided with a detector which detects the position of the roughness sensor 15 during movement in cooperation with the scale, thus forming a position sensor for detecting the position of the roughness sensor 15 during movement in the X direction.

The synchronous moving means 25 may be configured in any form insofar as it can move the roughness sensor 15 in synchronism with the axial movement of the piston 24A of the driving cylinder 24 in a manner following up the same. For example, as shown in FIG. 2, the piston 24A may be formed of a magnet (in this case, the driving cylinder 24 is formed of a non-magnetic material), a follow-up tube 25A which is formed of a magnetic material is slidably fitted on the driving cylinder 24, and the tube 25 is coupled to the holding member 23 for movement in unison therewith.

Figure 3:
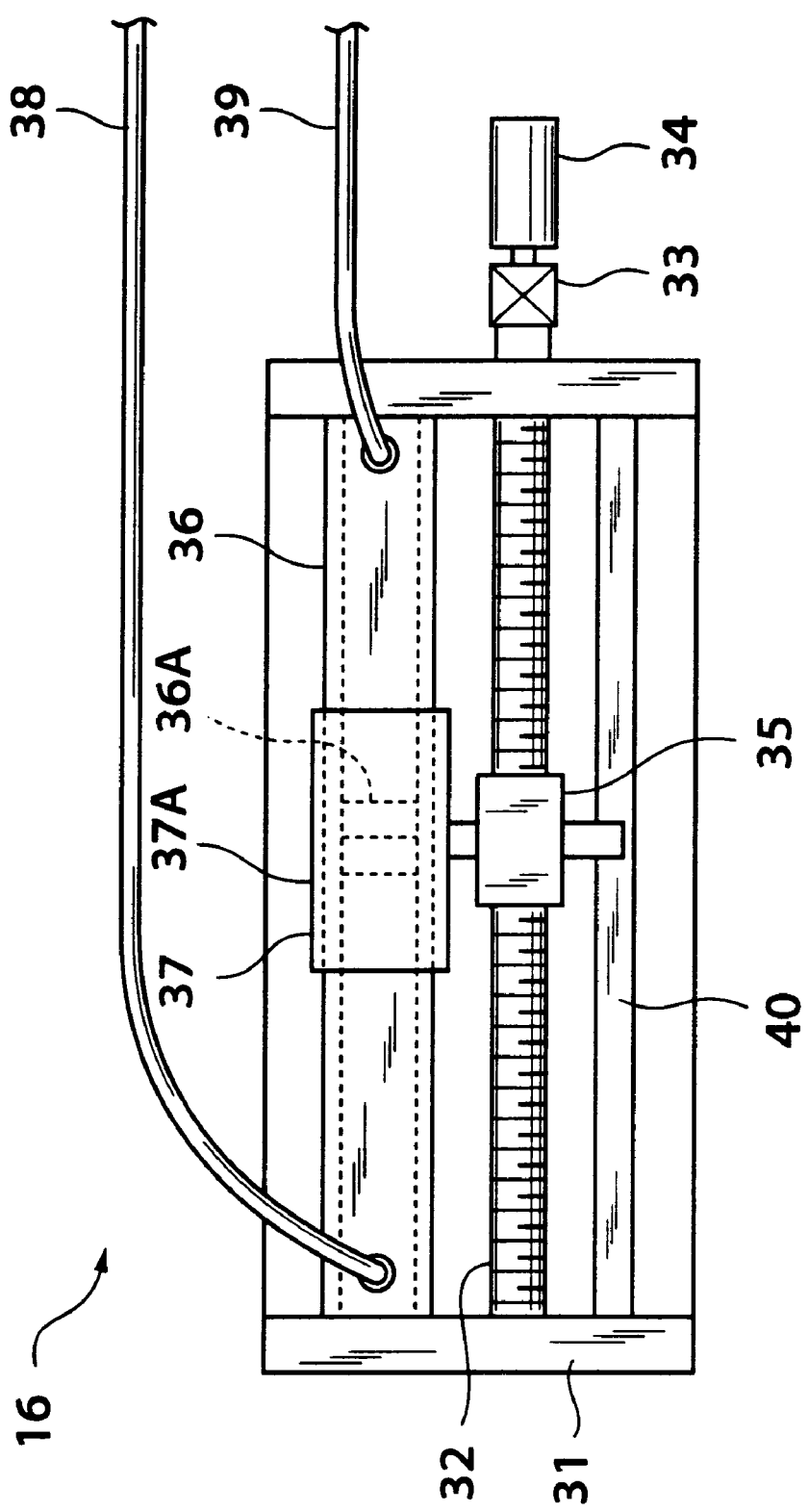
FIG. 3 is a view showing the construction of a hydraulic fluid control device of the driving arrangement according to the embodiment.

FIG. 3 shows details of the construction of the hydraulic fluid control device 16. As shown in the figure, the hydraulic fluid control device 16 is comprised of a base 31 in the form of a frame, a feed screw shaft 32 rotatably supported by the frame 31, a motor 34 drivingly coupled to one end of the feed screw shaft 32 via a coupling 33, a nut-shaped member 35 threadedly fitted on the feed screw shaft 32, for axial or forward and backward movement as the feed screw shaft 32 rotates, a control cylinder 36 mounted in the frame 31 in a fashion extending parallel with the feed screw shaft 32 and having a piston 36A slidably received therein for axial or forward and backward movement, synchronous moving means 37 disposed to move the piston 36A of the control cylinder 36 in synchronism with the axial movement of the nut-shaped member 35, and fluid conduits 38 and 39 connecting the control cylinder 36 to the driving cylinder 24 of the driving and guide device 14, for feeding hydraulic fluid discharged from the control cylinder 36 by the axial movement of the piston 36A of the control cylinder 36 to the driving cylinder 24 to cause axial movement of the piston 24A thereof.

The synchronous moving means 37 may be configured in any form insofar as it can move the piston 36A of the control cylinder 36 in synchronism with the axial movement of the nut-shaped member 35 in a manner following up the same. For example, as shown in FIG. 3, the piston 36A may be formed of a magnet (in this case, the control cylinder 36 is formed of a non-magnetic material), a follow-up tube 37A which is formed of a magnetic material is slidably fitted on the control cylinder 36, and the tube 37A is coupled to the nut-shaped member 35 for movement in unison therewith.

In FIG. 3, reference numeral 40 designates a rotation-restraining member (rotation-restraining means) which restrains the nut-shaped member 35 from rotating while permitting the same to axially move along the feed screw shaft 32.

Next, the operation of the present embodiment constructed as above will be described.

In measuring the surface roughness, first, the motor 34 of the hydraulic fluid control device 16 is actuated, and then the feed screw shaft 32 is rotated to cause the nut-shaped member 35 to axially move along the feed screw shaft 32. At this time, the piston 36A of the control cylinder 36 is moved via the synchronous driving means 37 in synchronism with the axial movement of the nut-shaped member 35, so that hydraulic fluid (oil) in a chamber defined in the control cylinder 36 on a side toward which the piston 36A is moved is discharged.

For instance, when the piston 36A is moved rightward as viewed in FIG. 3, hydraulic fluid (oil) in a right chamber of the control cylinder 36 is supplied through the fluid conduit 39 into a left chamber of the driving cylinder 24 of the driving and guide device 14. Accordingly, the piston 24A of the driving cylinder 24 is moved rightward as viewed in FIG. 2, and the roughness sensor 15 is correspondingly moved rightward as viewed in FIG. 2. Thus, the roughness sensor 15 is moved in the same direction and at the same speed as the direction and speed of movement of the nut-shaped member 35.

During the movement of the roughness sensor 15, the data processing unit 18 receives the data of the position of the roughness sensor 15 during movement in the X direction obtained by the driving and guide device 14 and the roughness signal indicative of displacement of the stylus in the Z direction from the roughness sensor 15 through the electrical equipment control unit 17, to thereby determine the surface roughness of the workpiece W to be measured.

As described above, according to the present embodiment, the driving and guide device 14 is provided on the support 13 erected on the base 11, which includes the driving cylinder 24 with the piston 24A slidably received therein for axial or forward and backward movement, and the synchronous moving means 25 which moves the roughness sensor 15 in synchronism with the forward and backward movement of the piston 24A of the driving cylinder 24, and the hydraulic fluid control device 16 is arranged at a location remote from the driving and guide device 14, which supplies hydraulic fluid to the driving cylinder 24 of the driving and guide device 14 so as to cause forward or backward movement of the piston 24A. As a result, the body of the measuring instrument can undergo reduced vibrations as compared with the construction of the conventional driving unit, thereby achieving higher measuring accuracy. Furthermore, the driving arrangement according to the present embodiment has a reduced weight as compared with the conventional driving unit, which can secure a good weight balance of the entire measuring instrument.

Further, according to the present embodiment, the driving and guide device 14 is comprised of the frame 21, the guide shaft 22 mounted in the frame 21 in a fashion extending parallel with the X direction, the holding member 23 slidably fitted on the guide shaft 22 and holding the roughness sensor 15 for movement in unison therewith, the driving cylinder 24 supported by the frame 21 in a fashion extending parallel with the guide shaft 22 and having the piston 24A slidably received therein for axial or forward and backward movement, and the synchronous moving means 25 disposed to move the roughness sensor 15 in synchronism with the axial movement of the piston 24A. As a result, the driving arrangement according to the present embodiment has a simple structure but is able to move the roughness sensor 15 in the X direction in a stable manner.

Further, according to the present embodiment, the hydraulic fluid control device 16 is comprised of the frame 31, the feed screw shaft 32 rotatably supported by the frame 31, the motor 34 drivingly coupled to the feed screw shaft 32, the nut-shaped member 35 threadedly fitted on the feed screw shaft 32, the control cylinder 36 mounted in the frame 31 in a fashion extending parallel with the feed screw shaft 32 and having the piston 36A slidably received therein for axial or forward and backward movement, the synchronous moving means 37 disposed to move the piston 36A of the control cylinder 36 in synchronism with the axial movement of the nut-shaped member 35, and the fluid conduits 38 and 39 connecting the control cylinder 36 to the driving cylinder 24 of the driving and guide device 14. With this arrangement, the nut-shaped member 35 can be axially moved with high accuracy as the feed screw shaft 32 is rotated, such that the roughness sensor 15 is moved forward or backward as the nut-shaped member 35 is moved forward or backward. As a result, the position and moving speed of the roughness sensor 15 can be controlled in a fine and highly accurate manner.

The construction of the hydraulic fluid control device 16 should not be limited to the above described one, but the device 16 may be implemented by other constructions.

Figure 4:
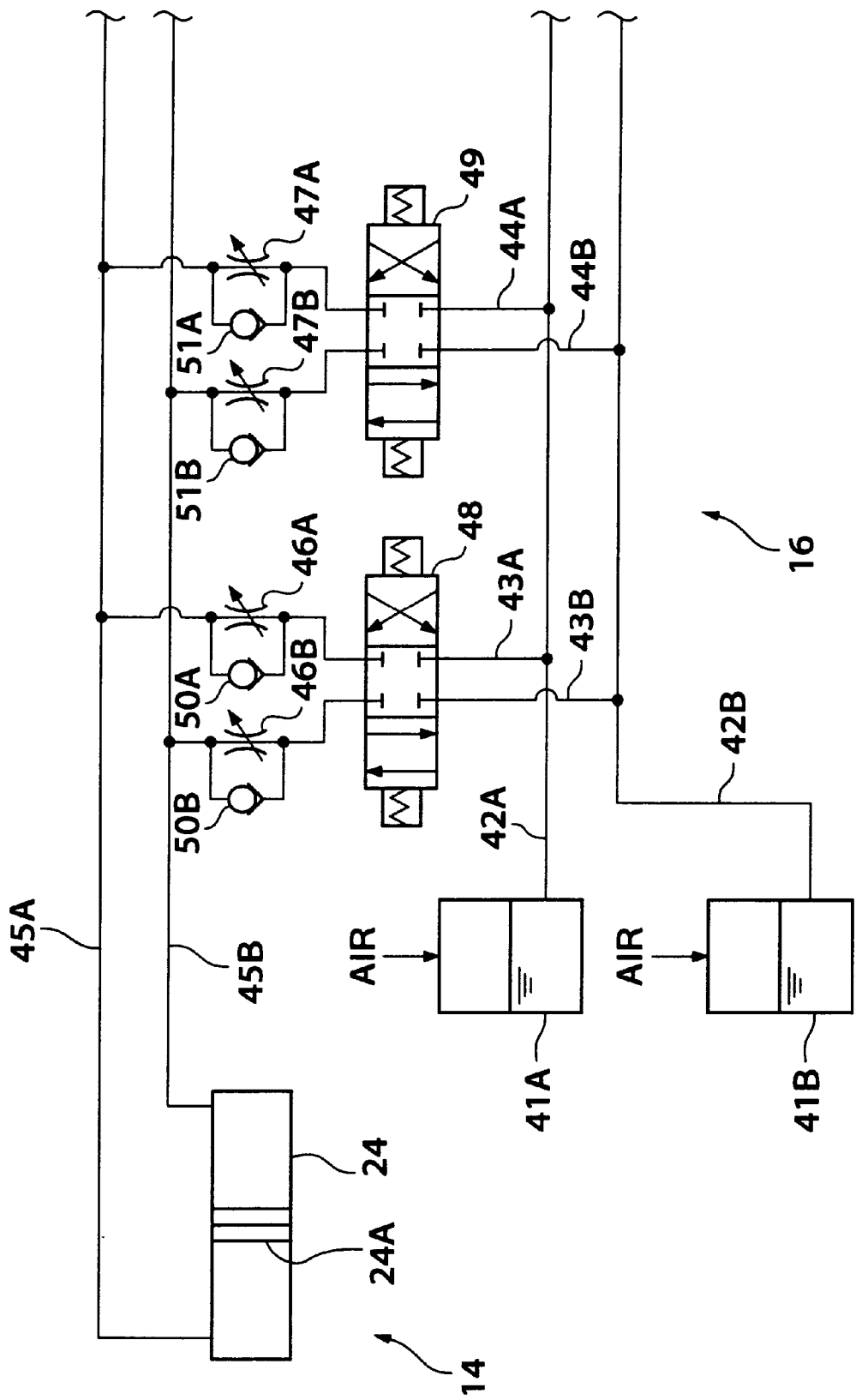
FIG. 4 is a schematic view showing the construction of a hydraulic fluid control device according to another embodiment of the present invention.

For example, as shown in FIG. 4, the hydraulic fluid control device 16 may be comprised of pneumatic pressure-to-hydraulic pressure converters 41A and 41B as two hydraulic fluid supply sources arranged at a location remote from the body of the measuring instrument (base 11), fluid conduits 42A, 42B, 43A, 43B, 44A, 44B, 45A, and 45B connecting the pneumatic pressure-to-hydraulic pressure converters 41A and 41B to the driving cylinder 24 of the driving and guide device 14 to supply hydraulic fluid from the converters 41A and 41B to the driving cylinder 24 so as to axially move the piston 24A, restrictors 46A, 46B, 47A, and 47B and electromagnetic directional control valves 48 and 49 arranged across the fluid conduits 43A, 43B, 44A, and 44B, and check valves 50A, 50B, 51A, and 51B connected in parallel to the restrictors 46A, 46B, 47A, and 47B.

With this arrangement, by setting the amount of restriction of the restrictors 46A and 46B and that of the restrictors 47A and 47B to different values from each other, the moving speed of the roughness sensor 15 can be varied. More specifically, by operating the directional control valves 48 and 49 to change their selected positions, a fluid path through the fluid conduits 43A and 43B or a fluid path through the fluid conduits 44A and 44B can be selectively established. On this occasion, if the amount of restriction of the restrictors 46A and 46B and that of the restrictors 47A and 47B are set to different values from each other, the moving speed of the roughness sensor 15 can be varied depending upon the selected fluid path.

According to the arrangement of FIG. 4 as well, the measuring instrument body side (base 11) is free of factors of generation of vibrations, making it possible to prevent degraded measuring accuracy due to the influence of vibrations.

In the above described embodiments, since the driving cylinder 24 and the control cylinder 36 are a rodless type, i.e. without a piston rod, and the synchronous moving means 25, 37 is constituted by a piston formed of a magnet and a follow-up tubular element formed of a magnetic material, no piston rod-accommodating space is needed, which would be required if a piston rod which is movable is connected to the piston, to thereby enable designing the driving arrangement compact in size. However, the driving cylinder 24 and the control cylinder 36 may be of a type having a piston rod. In this case, the synchronous moving means 25, 37 may each be constructed such that a portion of the piston rod projected outwardly of the cylinder 24, 36 is directly coupled to the holding member 23 or the nut-shaped member 35.

Figure 5:
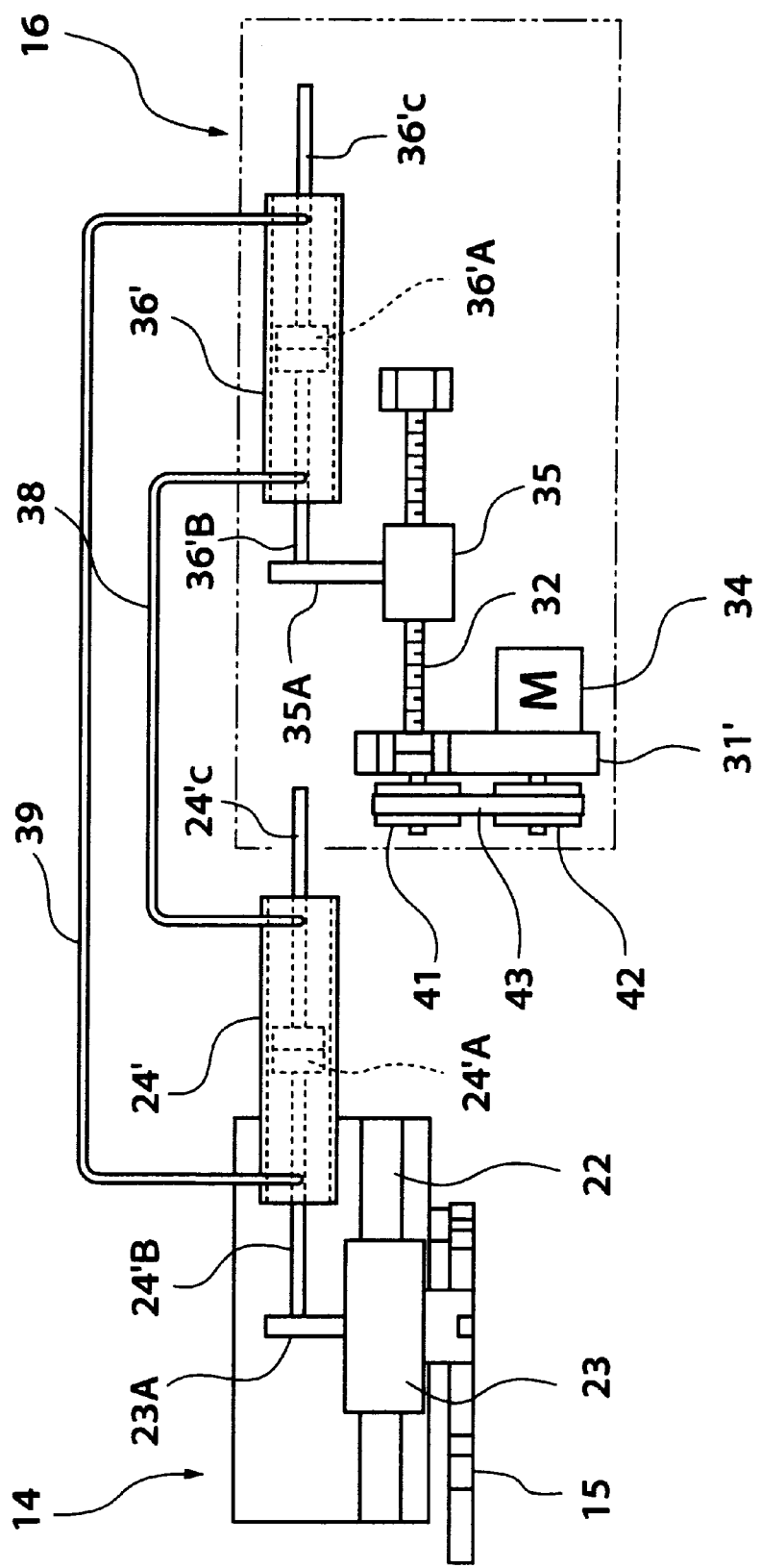
FIG. 5 is a schematic view showing the constructions of a driving and guide device and a hydraulic fluid control device of a driving arrangement for a measuring instrument according to a further embodiment of the present invention.

FIG. 5 shows the constructions of a driving and guide device and a hydraulic fluid control device of a driving arrangement for a measuring instrument according to a further embodiment of the present invention. In this embodiment, in place of the driving cylinder 24 and the control cylinder 36 employed in the above described embodiments, cylinders with piston rods are employed for the same purposes. In FIG. 5, elements and parts corresponding to those in FIGS. 2 and 3 are designated by identical reference numerals.

The driving and guide device 14 includes a driving cylinder 24' having a piston 24'A slidably received therein for axial or forward and backward movement, and a pair of piston rods 24'B and 24'C coupled at ends thereof to opposite ends of the piston 24'A for movement in unison therewith. The piston rods 24'B, 24'C have other end portions thereof projected outwardly from respective opposite ends of the driving cylinder 24'. The holding member 23 is coupled to a tip of the other end portion of the piston rod 24'B for movement in unison therewith, by means of a coupling rod 23A. The piston rod 24'B and the coupling rod 23A constitute synchronous moving means corresponding to the synchronous moving means 25 shown in FIG. 2.

The hydraulic fluid control device 16 includes a control cylinder 36' having a piston 36'A slidably received therein for axial or forward and backward movement, and a pair of piston rods 36'B and 36'C coupled at ends thereof to opposite ends of the piston 36' for movement in unison therewith. The piston rods 36'B, 36'C have other end portions thereof projected outwardly from respective opposite ends of the control cylinder 36'. The nut-shaped member 35 is coupled to a tip of the other end portion of the piston rod 36'B for movement in unison therewith, by means of a coupling rod 35A. The feed screw shaft 32 on which the nut-shaped member 35 is threadedly fitted has one end thereof extending through a base 31' in a manner being rotatably supported thereby. The motor 34 is drivingly connected to the one end of the feed screw shaft 32 through pulleys 41 and 42 and a belt 43. The piston rod 36'B and the coupling rod 35A constitute synchronous moving means corresponding to the synchronous moving means 37 shown in FIG. 3.

Except for those described above, the driving and guide device 14 and the hydraulic fluid control device 16 are identical in construction with those shown in FIGS. 2 and 3, and further description thereof is therefore omitted.

With the above arrangement, when the motor 34 is actuated, the feed screw shaft 32 is rotated through the pulleys 41, 42 and the belt 43 to cause axial movement of the nut-shaped member 35 along the feed screw shaft 32. At this time, the piston 36'A of the control cylinder 36' is moved through the coupling rod 35A and the piston rod 36'B in synchronism with the axial movement of the nut-shaped member 35. Accordingly, hydraulic fluid flows through the fluid conduits 38, 39 to cause movement of the piston 24'A of the driving cylinder 24', which in turn causes movement of the holding member 23 through the piston rod 24'B and the coupling rod 23A to thereby move the roughness sensor 15.

According to the present embodiment, since the holding member 23 and the nut-shaped member 35 are directly coupled to the respective piston rods 24'B, 36'B of the driving cylinder 24' and the control cylinder 36', the dead band at the time of reversal of the moving direction of the piston of each cylinder is smaller as compare with the magnetic coupling between the piston 24A, 36A and the follow-up tubular element 25A, 37A shown in FIGS. 2 and 3. For example, in the case of the magnetic coupling between the piston 24A, 36A and the follow-up tubular element 25A, 37A shown in FIGS. 2 and 3, the dead band is 6–7 mm, whereas in the present invention it is 2 mm or less. As a result, the measuring accuracy can be further enhanced.

Although in the FIG. 5 embodiment described above, the driving cylinder 24' and the control cylinder 36' are a double rod type having a pair of piston rods, it goes without saying that they may be a single rod type having a single piston rod.

Further, although in the above described embodiments the driving arrangement according to the present invention is applied to a surface roughness measuring instrument, this is not limitative, but it may be applied to other types of measuring instruments insofar as they have a movable element which is movable relative to the measuring instrument body and are adapted to carry out measurement of an object to be measured, by moving the movable element. For example, the driving arrangement according to the present invention may be applied to a form measuring instrument, a straightness measuring instrument, a squareness measuring instrument, etc.

What is claimed is:

1. A driving arrangement for a measuring instrument having a body, and a movable element being movable relative to the body, wherein measurement of an object to be measured is carried out through movement of the movable element, the driving arrangement comprising:

driving and guide means adapted to be mounted on the body of the measuring instrument, the driving and guide means including a driving cylinder having a piston received in the driving cylinder for axial movement of the piston in the driving cylinder, the driving and guide means being operable to move the movable element in synchronism with the axial movement of the piston; and hydraulic fluid control means arranged at a location remote from the body of the measuring instrument, for supplying hydraulic fluid to the driving cylinder of the driving and guide means to cause the axial movement of the piston in the driving cylinder.

2. A driving arrangement as claimed in claim 1, wherein the driving and guide means comprises:

a base, guide means mounted on the base and extending parallel with a moving direction of the movable element and supporting the movable element for axial movement, said driving cylinder being supported by the base and extending parallel with the guide means and having said piston received therein for said axial movement, and synchronous moving means for moving the movable element in synchronism with the axial movement of the piston in the driving cylinder.

3. A driving arrangement as claimed in claim 2, wherein the guide means comprises:

a guide shaft mounted on the base and extending parallel with the moving direction of the movable element, and a holding member movably mounted on the guide shaft and adapted to hold the movable element.

4. A driving arrangement as claimed in claim 3, wherein the guide shaft and the holding member form a position sensor which is adapted to sense a position of the movable element during movement.

5. A driving arrangement as claimed in claim 3, wherein the synchronous moving means comprises:

a follow-up tubular element movably fitted on the driving cylinder and coupled to the holding member for movement in unison with the holding member, the follow-up tubular element being formed of a magnetic material and movable in synchronism with the axial movement of the piston in the driving cylinder, which is formed of a magnet.

6. A driving arrangement as claimed in claim 3, wherein the synchronous moving means comprises:

a piston rod having one end thereof coupled to the piston for movement in unison with the piston, and another end portion thereof projected outwardly from the driving cylinder, and a coupling rod coupling the holding member to the other end portion of the piston rod for movement in unison with the piston rod, the synchronous moving means being movable in synchronism with the axial movement of the piston in the driving cylinder.

7. A driving arrangement as claimed in claim 2, wherein the hydraulic fluid control means comprises:

a base, a feed screw shaft rotatably supported by the base, a motor for rotatively driving the feed screw shaft, a nut-shaped member threadedly fitted on the feed screw shaft for axial movement in unison with rotation of the feed screw shaft, a control cylinder mounted on the base and extending parallel with the feed screw shaft and having a piston received therein for axial movement, synchronous moving means for moving the piston of the control cylinder in synchronism with the axial movement of the nut-shaped member, and fluid conduit means connecting the control cylinder to the driving cylinder of the driving and guide means, for feeding hydraulic fluid discharged from the control cylinder by the axial movement of the piston of the control cylinder to the driving cylinder to cause the axial movement of the piston of the driving cylinder.

8. A driving arrangement as claimed in claim 2, wherein the hydraulic fluid control means comprises:
   a hydraulic fluid supply source arranged at a location remote from the body of the measuring instrument,
   fluid conduit means connecting the driving cylinder of the driving and guide means to the hydraulic fluid supply source, for feeding hydraulic fluid from the hydraulic fluid supply source, to the driving cylinder to cause the axial movement of the piston thereof, and
   restrictor means inserted in the fluid conduit means.

9. A driving arrangement as claimed in claim 2, wherein the movable element comprises a sensor arranged for movement relative to the object to be measured, and adapted to detect a predetermined property of the object.

10. A driving arrangement as claimed in claim 2, wherein said measuring instrument is a measuring instrument selected from the group consisting of a surface roughness measuring instrument, a form measuring instrument, a straightness measuring instrument, and a squareness measuring instrument.

11. A driving arrangement as claimed in claim 1, wherein the hydraulic fluid control means comprises:
   a base,
   a feed screw shaft rotatably supported by the base,
   a motor for rotatively driving the feed screw shaft,
   a nut-shaped member threadedly fitted on the feed screw shaft for axial movement in unison with rotation of the feed screw shaft, a control cylinder mounted on the base and extending parallel with the feed screw shaft and having a piston received therein for axial movement,
   synchronous moving means for moving the piston of the control cylinder in synchronism with the axial movement of the nut-shaped member, and
   fluid conduit means connecting the control cylinder to the driving cylinder of the driving and guide means, for feeding hydraulic fluid discharged from the control cylinder by the axial movement of the piston of the control cylinder to the driving cylinder to cause the axial movement of the piston of the driving cylinder.

12. A driving arrangement as claimed in claim 11, wherein the synchronous moving means of the hydraulic fluid control means comprises:
   a follow-up annular element movably fitted on the control cylinder and coupled to the nut-shaped member for movement in unison with the nut-shaped member,
   the follow-up element being formed of a magnetic material and movable in synchronism with the axial movement of the nut-shaped member, to thereby move the piston of the control cylinder which is formed of a magnet.

13. A driving arrangement as claimed in claim 11, wherein the synchronous moving means comprises:
   a piston rod having one end thereof coupled to the piston of the control cylinder for movement in unison with the piston of the control cylinder, and another end portion thereof projected outwardly from the control cylinder, and
   a coupling rod coupling the nut-shaped member to the other end portion of the piston rod for movement in unison with the piston rod,
   the synchronous moving means being movable in synchronism with the axial movement of the nut-shaped member, to thereby move the piston of the control cylinder.

14. A driving arrangement as claimed in claim 1, wherein the hydraulic fluid control means comprises:
   a hydraulic fluid supply source arranged at a location remote from the body of the measuring instrument,
   fluid conduit means connecting the driving cylinder of the driving and guide means to the hydraulic fluid supply source, for feeding hydraulic fluid from the hydraulic fluid supply source to the driving cylinder to cause the axial movement of the piston thereof, and
   restrictor means inserted in the fluid conduit means.

15. A driving arrangement as claimed in claim 1, wherein the movable element comprises a sensor arranged for movement relative to the object to be measured, and adapted to detect a predetermined property of the object.

16. A driving arrangement as claimed in claim 1, wherein said measuring instrument is a measuring instrument selected from the group consisting of a surface roughness measuring instrument, a form measuring instrument, a straightness measuring instrument, and a squareness measuring instrument.

17. A measuring instrument comprising:
   a body;
   a movable element being movable relative to the body; and
   a driving arrangement for moving the movable element for carrying out measurement of an object to be measured, the driving arrangement comprising;
   driving and guide means mounted on the body of the measuring instrument, the driving and guide means including a driving cylinder having a piston received in the driving cylinder for axial movement, the driving and guide means being operable to move the movable element in synchronism with the axial movement of the piston; and
   hydraulic fluid control means arranged at a location remote from the body of the measuring instrument, for supplying hydraulic fluid to the driving cylinder of the driving and guide means to cause the axial movement of the piston in the driving cylinder.

18. A driving arrangement for use with an apparatus having a body, and a movable element being movable relative to the body, wherein the driving arrangement is adapted to move the movable element, the driving arrangement comprising:
   driving and guide means adapted to be mounted on the body of the apparatus, the driving and guide means including a driving cylinder having a piston received in the driving cylinder for axial movement of the piston in the driving cylinder, the driving and guide means being operable to move the movable element in synchronism with the axial movement of the piston; and
   hydraulic fluid control means arranged at a location remote from the body of the apparatus, for supplying hydraulic fluid to the driving cylinder of the driving and guide means to cause the axial movement of the piston in the driving cylinder.

19. A driving arrangement as claimed in claim 18, wherein the driving and guide means comprises:
   a base,
   guide means mounted on the base and extending parallel with a moving direction of the movable element and supporting the movable element for axial movement,
   said driving cylinder being supported by the base and extending parallel with the guide means and having said piston received therein for said axial movement, and synchronous moving means for moving the movable element in synchronism with the axial movement of the piston in the driving cylinder.

20. A driving arrangement as claimed in claim 19, wherein the guide means comprises:

a guide shaft mounted on the base and extending parallel with the moving direction of the movable element, and a holding member movably mounted on the guide shaft and adapted to hold the movable element.

21. A driving arrangement as claimed in claim 20, wherein the guide shaft and the holding member form a position sensor which is adapted to sense a position of the movable element during movement.

22. A driving arrangement as claimed in claim 20, wherein the synchronous moving means comprises:

a follow-up tubular element movably fitted on the driving cylinder and coupled to the holding member for movement in unison with the holding member, the follow-up tubular element being formed of a magnetic material and movable in synchronism with the axial movement of the piston in the driving cylinder, which is formed of a magnet.

23. A driving arrangement as claimed in claim 20, wherein the synchronous moving means comprises:

a piston rod having one end thereof coupled to the piston for movement in unison with the piston, and another end portion thereof projected outwardly from the driving cylinder, and a coupling rod coupling the holding member to the other end portion of the piston rod for movement in unison with the piston rod, the synchronous moving means being movable in synchronism with the axial movement of the piston in the driving cylinder.

24. A driving arrangement as claimed in claim 18, wherein the hydraulic fluid control means comprises:

a base, a feed screw shaft rotatably supported by the base, a motor for rotatively driving the feed screw shaft, a nut-shaped member threadedly fitted on the feed screw shaft for axial movement in unison with rotation of the feed screw shaft, a control cylinder mounted on the base and extending parallel with the feed screw shaft and having a piston received therein for axial movement, synchronous moving means for moving the piston of the control cylinder in synchronism with the axial movement of the nut-shaped member, and fluid conduit means connecting the control cylinder to the driving cylinder of the driving and guide means, for feeding hydraulic fluid discharged from the control cylinder by the axial movement of the piston of the control cylinder to the driving cylinder to cause the axial movement of the piston of the driving cylinder.

25. A driving arrangement as claimed in claim 24, wherein the synchronous moving means of the hydraulic fluid control means comprises:

a follow-up annular element movably fitted on the control cylinder and coupled to the nut-shaped member for movement in unison with the nut-shaped member, the follow-up element being formed of a magnetic material and movable in synchronism with the axial movement of the nut-shaped member, to thereby move the piston of the control cylinder which is formed of a magnet.

26. A driving arrangement as claimed in claim 24, wherein the synchronous moving means comprises:

a piston rod having one end thereof coupled to the piston of the control cylinder for movement in unison with the piston of the control cylinder, and another end portion thereof projected outwardly from the control cylinder, and a coupling rod coupling the nut-shaped member to the other end portion of the piston rod for movement in unison with the piston rod, the synchronous moving means being movable in synchronism with the axial movement of the nut-shaped member, to thereby move the piston of the control cylinder.

27. A driving arrangement as claimed in claim 18, wherein the hydraulic fluid control means comprises:

a hydraulic fluid supply source arranged at a location remote from the body of the apparatus, fluid conduit means connecting the driving cylinder of the driving and guide means to the hydraulic fluid supply source, for feeding hydraulic fluid from the hydraulic fluid supply source to the driving cylinder to cause the axial movement of the piston thereof, and restrictor means inserted in the fluid conduit means.

28. A driving arrangement as claimed in claim 18, wherein the movable element comprises a sensor adapted to detect a predetermined property of an object.

* * * * *